Patented Nov. 28, 1944

2,363,739

UNITED STATES PATENT OFFICE 2,363,739

PRODUCTION OF HYDROCARBONS

Klaus Meisenheimer and Arno Scheuermann, Ludwigshafen-on-the-Rhine, Germany; vested in the Alien Property Custodian No Drawing. Application February 20, 1940, Serial No. 319,838. In Germany February 21, 1939

3 Claims. (Cl. 260—449.6)

The present invention relates to a process for the production of hydrocarbons with more than one carbon atom in the molecule by conversion of carbon monoxide with hydrogen. The methods according to which this process has hitherto usually been carried out in practice can be classified into two types of operation which differ in several respects. The said conversion can be carried out firstly as a high pressure process by employing pressures of more than about 20 atmospheres, preferably more than 50 atmospheres, say 70 or 100 atmospheres, and secondly as a low pressure process, wherein pressures of less than about 20 atmospheres, preferably less than 15 atmospheres, say 10, 5 or 2 atmospheres or atmospheric pressure or thereabout are employed. In the said high pressure process as well as in the low pressure process, catalysts the active substance of which is a metal of the iron group, are usually employed. However, whereas for the high pressure process iron is preferred, the low pressure process is preferably carried out in the presence of cobalt catalysts, although the cobalt catalysts may also advantageously be employed when working under pressures above 20 atmospheres. A further difference is that, with the high pressure process, which is usually carried out at relatively high temperatures of for example 300 to 350° C., catalysts, containing the active iron in the form of an easily reducible compound, can be reduced without difficulty in the reaction chamber itself.

The reduction temperatures for the catalysts hitherto employed for the low pressure process lie between 350° and 450° C. and they are therefore considerably higher than the temperatures actually employed for the conversion, under low pressure, of carbon monoxide with hydrogen which is carried out between about 180° and 230° C. Inasmuch, on account of the strong evolution of heat during the synthesis reaction and further on account of the necessity to maintain the reaction temperature within narrow limits, specially designed reaction chambers are employed which for example are traversed by a plurality of cooling tubes, and which would not stand up under the high temperature stresses occurring during the reduction of the catalysts, it is not possible to carry out both the reduction and the synthesis reaction in the same apparatus.

So far the catalysts for the low pressure process have therefore been reduced in a special reduction apparatus and subsequently the reaction vessels have been charged with the reduced catalyst whereby, in view of its pyrophoric character, care has to be taken to protect the catalyst against contact with air, for example by keeping the catalyst in an atmosphere of carbon dioxide or suspending it in oil.

In order to avoid this complicated procedure, it has already been proposed to add copper or copper compounds to the cobalt catalysts. Thereby it was achieved to reduce the catalysts in the neighborhood of the temperature of the conversion reaction or only slightly above the latter temperature, so that the reduction procedure might be carried out in the reaction chamber itself. However, the activity of these cobalt-copper catalysts and the time during which they retain their activity are inferior to those of the catalysts which contain no copper.

We have now found that the said low pressure process can advantageously be carried out with catalysts which contain cobalt together with 8 per cent by weight or less (calculated with reference to cobalt) of silver as such or in the form of a compound and which have previously been subjected to a treatment with reducing gases in the reaction vessel for the said low pressure process at a temperature of about or only slightly above that employed in said low pressure process. The said catalysts very surprisingly do not show the disadvantage of inferior activity and life inherent to the said cobalt-copper catalysts.

The said treatment with reducing gases may be carried out with free hydrogen or gases containing free hydrogen. Advantageously the mixture of hydrogen and carbon monoxide which is to be converted into hydrocarbons may be employed for this purpose. The temperature employed in the said reducing treatment may be within the range which is maintained in the low pressure conversion process, or at a slightly higher temperature, for example up to 250° C.

The silver may be added in the preparation of the catalysts according to the present invention in the metallic form or in the form of a silver compound or of a solution of a silver compound, from which the silver may be precipitated.

A further advantageous way for the production of the catalyst is to precipitate the cobalt and the silver together from mixed solutions of their compounds, for example by an addition of potassium carbonate.

The catalyst according to the present invention may also contain further constituents, such as iron and/or nickel and also promoters such as the oxides of thorium or magnesium, or mixtures thereof, may be added to the catalysts, for example in the form of easily decomposable compounds, such as the nitrates, or solutions thereof, before or after or simultaneously with the addition of the silver. Furthermore the production of the catalysts may be carried out in the presence of carriers, for example diatomaceous earth and the like. The catalysts used for the synthesis of hydrocarbons from carbon monoxide and hydrogen are known to be sensitive to poisons such as sulfur, and the presence of such poisons is preferably avoided in the materials used in preparing such catalysts and in pretreating them.

The following examples will further illustrate the nature of the present invention and in what manner the same can be carried out in practice, but it should be understood that the invention is not limited to said examples. The percentages are by weight.

Example 1

A potassium carbonate solution is gradually added at room temperature, while stirring, during several hours to an aqueous solution of cobalt nitrate and silver nitrate, to which diatomaceous earth had been added. The precipitate obtained is filtered, washed and dried at 110° centigrade.

The dried precipitate contains about 31 per cent of cobalt and 2 per cent of silver.

The catalyst is prepared from the dried precipitate by a reducing treatment with hydrogen at 220° centigrade, carried out in a reaction vessel suitable for the conversion of carbon monoxide into hydrocarbons according to the low pressure process. Subsequently a mixture of carbon monoxide and hydrogen is passed through the said reaction vessel under normal pressure and at a temperature of 190° centigrade. Thereby 115 grams of liquid and solid hydrocarbons are obtained per normal cubic metre of the carbon monoxide - hydrogen - mixture employed. When working under a pressure of 12 atmospheres, the yield amounts to 135 grams, containing 100 grams of paraffinic hydrocarbons having a boiling point above 320° centigrade.

Example 2

A catalyst consisting of 30 per cent of cobalt, 5.4 per cent of thorium oxide and 2 per cent of silver, the remaining part being diatomaceous earth, is produced in the same way as set out in Example 1. After the addition of the potassium carbonate solution the solution is, however, boiled for a short time. After reduction with hydrogen at 220° centigrade in the reaction vessel, a mixture of carbon monoxide and hydrogen is passed over the catalyst at about 190° centigrade and under normal pressure, whereby a yield of 120 grams of hydrocarbons per normal cubic metre of the carbon monoxide-hydrogen-mixture is obtained.

What we claim is:

1. A process for the production of hydrocarbons with more than one carbon atom in the molecule by catalytic conversion of carbon monoxide with hydrogen, under pressures less than 20 atmospheres and at temperatures within the range of 180° to 230° C., which comprises employing a catalyst which contains cobalt and a substantial amount not exceeding 8 per cent by weight, calculated with reference to the cobalt, of a substance selected from the class consisting of silver and its compounds and which have previously been subjected to a treatment with a reducing gas in the reaction vessel employed for said catalytic conversion at a temperature of about the temperature employed in said catalytic conversion.

2. A process as claimed in claim 1, which comprises carrying out the said treatment with a reducing gas at temperatures up to 250° C.

3. A process for the production of hydrocarbons with more than 1 carbon atom in the molecule by catalytic conversion of carbon monoxide with hydrogen under pressures less than 20 atmospheres and at temperatures within the range of 180° to 230° C., which comprises employing a catalyst which contains cobalt and a substantial amount not exceeding 8% by weight, calculated with reference to the cobalt, of silver.

KLAUS MEISENHEIMER.
ARNO SCHEUERMANN.